(12) United States Patent
Wursche et al.

(10) Patent No.: US 10,689,483 B2
(45) Date of Patent: Jun. 23, 2020

(54) PROCESS FOR PREPARING POLYALKENAMERS FOR PACKAGING APPLICATIONS

(71) Applicant: Evonik Operations GmbH, Essen (DE)

(72) Inventors: Roland Wursche, Duelmen (DE); Juergen Herwig, Huenxe (DE)

(73) Assignee: Evonik Operations GmbH, Essen (DE)

( * ) Notice: Subject to any disclaimer, the term of this patent is extended or adjusted under 35 U.S.C. 154(b) by 341 days.

(21) Appl. No.: 15/743,205

(22) PCT Filed: Jul. 14, 2016

(86) PCT No.: PCT/EP2016/066730
§ 371 (c)(1),
(2) Date: Jan. 9, 2018

(87) PCT Pub. No.: WO2017/009411
PCT Pub. Date: Jan. 19, 2017

(65) Prior Publication Data
US 2019/0127516 A1 May 2, 2019

(30) Foreign Application Priority Data
Jul. 14, 2015 (EP) .................................. 15176655

(51) Int. Cl.
| C08F 6/00 | (2006.01) |
| C08G 61/06 | (2006.01) |
| C08G 61/08 | (2006.01) |
| C08L 65/00 | (2006.01) |
| B65B 3/02 | (2006.01) |
| B65B 5/02 | (2006.01) |
| C08J 3/12 | (2006.01) |

(52) U.S. Cl.
CPC ............... *C08G 61/06* (2013.01); *B65B 3/02* (2013.01); *B65B 5/02* (2013.01); *C08F 6/001* (2013.01); *C08G 61/08* (2013.01); *C08J 3/12* (2013.01); *C08L 65/00* (2013.01); *C08G 2261/3322* (2013.01); *C08G 2261/418* (2013.01); *C08G 2261/71* (2013.01); *C08G 2390/00* (2013.01)

(58) Field of Classification Search
CPC .............................. C08G 61/06; C08G 65/485
See application file for complete search history.

(56) References Cited

U.S. PATENT DOCUMENTS

| 3,804,803 A * | 4/1974 | Streck et al. .......... | C08G 61/08 526/209 |
| 3,816,382 A * | 6/1974 | Streck .................... | C08G 61/08 526/90 |
| 4,360,629 A * | 11/1982 | Wootton ................ | C08G 61/08 524/553 |
| 5,100,972 A * | 3/1992 | Sivavec ................. | C08G 61/08 525/391 |
| 5,141,998 A * | 8/1992 | Sivavec ................. | C08G 61/08 525/391 |
| 5,580,913 A * | 12/1996 | Mumcu ................... | C08J 3/203 523/220 |
| 6,656,988 B1 * | 12/2003 | Fischer ................. | C08K 5/103 524/315 |
| 8,852,026 B2 * | 10/2014 | Sullivan ............ | A63B 37/0051 473/376 |
| 2012/0058332 A1 * | 3/2012 | Muller ................... | C08J 7/042 428/336 |
| 2013/0172635 A1 | 7/2013 | Hannen et al. | |

FOREIGN PATENT DOCUMENTS

| DE | 101 02 086 A1 | 3/2002 | |
| DE | 10102086 A1 * | 3/2002 | ............ C08G 61/08 |
| DE | 10 2010 030 510 A1 | 12/2011 | |
| EP | 2 017 308 A1 | 1/2009 | |
| JP | H02-36224 | 2/1990 | |
| JP | H04-353518 | 12/1992 | |
| JP | H11-124429 | 5/1999 | |
| JP | 2011-178140 | 9/2011 | |
| JP | 2013-184925 A | 9/2013 | |
| WO | 1994/007379 A1 | 4/1994 | |
| WO | 1994/007944 A1 | 4/1994 | |
| WO | 1998/006779 A1 | 2/1998 | |

OTHER PUBLICATIONS

International Search Report mailed in PCT/EP2016/066730, dated Oct. 17, 2016.
Written Opinion of the International Searching Authority, dated Jan. 19, 2017.
Benjamin K. Keitz, "Diastereocontrol in Olefin Metathesis: The Development of Z-Selective Ruthenium Catalysts", Handbook of Metathesis vol. 1: Catalyst Development and Mechanism, Second Edition. Edited by Robert H. Grubbs and Anna G. Wenzel.
M. Schon, R. Hubner, Geruch—Messung und Beseitigung [Odour—Measurement and Elimination], Vogel Publishers Wurzburg, 1st edition 1996, ISBN 3-8023-1561-8; Umweltbundesamt.
K.J. Irvin and J.C. Mol, "Monocyclic Alkenes and Polyenes" Olefin Metathesis and Metathesis Polymerization, Academic Press 1997; Handbook of Metathesis, vol. 1-3, R.H. Grubbs, Wiley-VCH 2003. pp. 260-287.
Weskamp et al., J. Organomet. Chem. 1999, 582, 362-365.
Weskamp et al., Angew. Chem. Int. Ed. 1999, 38, 2416-2419.
Nguyen et al., J. Am. Chem. Soc. 1992, 114, 3974-3975.
Bielawski et al., Angew. Chem. Int. Ed. 2000, 39, 2903-2906.
Bradrup et al., Polymer Handbook, 4$^{th}$ edition, John Wiley, New York, 1999, ISBN 0-471-16628-6, VII/676, VII 688-694, and VII/694-697.
Jackson et al., Ind. Eng. Chem., 1959, 51(12), 1491-1493.
Scharfenberger et al. Umweltbundesamt, Innenraumlufthygiene-Kommission des Umweltbundesamtes, Leitfaden fur die lnnenraumhygiene in Schulgebauden [German Environment Agency, Indoor Air Hygiene Commission of the German Environment Agency, Guidelines for Indoor Air Hygiene in School Buildings], p. 47, 2008; 10, 1990.
Draxler, Handbook of Elastomers, 2$^{nd}$ Ed., Chap. 26, 697-722, 2001.
M. Schlegelmilch, Geruchsmanagement: Methoden zur Bewertung und Verminderung van Geruchsemissionen [Odour Management: Methods of Assessing and Reducing Odour Emissions], Hamburger Berichte 32 from the Hamburg-Harburg University of Technology, Abfall aktuell Publishers 2009, ISBN 978-3-9810064-9-0.

\* cited by examiner

*Primary Examiner* — Andrew M Tecco
*Assistant Examiner* — Eyamindae C Jallow
(74) *Attorney, Agent, or Firm* — Grüneberg and Myers PLLC

(57) ABSTRACT

The present invention relates to a process for producing cycloalkenamer-containing compositions and to such cycloalkenamer-containing compositions. The invention further relates to the use of these cycloalkenamer-containing compositions in the field of packaging materials, especially for food and drink.

18 Claims, No Drawings

PROCESS FOR PREPARING POLYALKENAMERS FOR PACKAGING APPLICATIONS

The present invention relates to polyalkenamer-containing compositions and to a process for production thereof. The invention further relates to the use of polyalkenamer-containing compositions in the field of packaging materials, especially for food and drink.

To increase the lifetime of packaged foods, it is possible to employ the principle of the active oxygen barrier. This means that, as well as the customary passive barrier layers, for example nylon-6, polyethylene terephthalate or ethylene-vinyl alcohol copolymer, additional "active" components which bind oxygen by chemical reaction (oxidation) are used in the packaging. This may firstly relate to oxygen present within a packaging (residual oxygen in modified atmosphere packaging (MAP) packaging) and secondly to oxygen which diffuses into the packaging through the passive barrier over the course of time. This "active" component may be present in different regions of the packaging; for example, it may be part of a separate layer of a multilayer packaging system or else introduced directly into the above-mentioned passive barrier layer. The chemical reaction with the additional "active" component reduces any chemical reaction of the oxygen with, for example, ingredients of the packaged foods (fats, vitamins, etc.) or else aerobic bacterial and fungal growth, such that the quality of the foods is conserved for longer. This in turn give rise to advantages, since less food is spoiled prior to sale or prior to consumption and so resources are conserved in various aspects. Furthermore, a lower level of preservatives, if any, needs to be added to foods. Typically, the active component contains a readily oxidizable organic compound, and additionally further constituents such as metal salts as catalysts or else photoinitiators. Oxidizable compounds proposed for this purpose are, for example, polyoctenamers; see, for example, EP2017308A1, WO9407944A1, WO9407379A1 and WO9806779A1.

The preparation of polyoctenamer is known from the literature (see, for example, US2013/172635), and it follows the principle of what is called metathesis polymerization. It is also known that polyoctenamer, like other metathesis polymers too, starting with the monomer, contains a proportion of low molecular weight cyclic compounds (oligomers) (see A. Draxler in Handbook of Elastomers, 2nd edition, 697-722, 2001). These molecules are relatively mobile up to a particular molecular weight, i.e. are converted to the gas phase and lead to a disadvantageous odour of packaging materials because of their odour activity. Moreover, they are fat-soluble because of their polarity, and so it is conceivable that they will pass over into the packaged material. Because of these properties, the polymers prepared by metathesis have limited possible use in packaging applications, meaning that important fields of application even remain closed, specifically for the purpose of utilization of polyoctenamers as a constituent of a packaging containing an "active oxygen barrier". Extraction of low molecular weight cyclic compounds from polyoctenamers with acetone or isopropanol has been described in the literature; see A. Draxler in Handbook of Elastomers, 2nd edition, 697-722, 2001. EP2017308A1 also describes corresponding extractions with various solvents.

The ring-opening metathesis polymerization (ROMP) of cycloalkenes is known per se (Olefin Metathesis and Metathesis Polymerization, K. J. Irvin, J. C. Mol, Academic Press 1997; Handbook of Metathesis, Vol. 1-3, R. H. Grubbs, Wiley-VCH 2003). This reaction is catalysed by a number of transition metals or compounds thereof, often with use of a cocatalyst which, together with the transition metal or the added transition metal compound, forms the catalytically active transition metal species in a reaction. Suitable cocatalysts are particularly aluminium organyls and tin organyls.

Other catalysts are based on defined transition metal complexes. The most well-known compounds include complexes based on ruthenium (Weskamp, T., Kohl, F. J., Herrmann, W. A. J. Organomet. Chem. 1999, 582, 362-365; Weskamp, T., Kohl, F. J., Hieringer, W., Gleich, D., Hermann, W. A. Angew. Chem. Int. Ed. 1999, 38, 2416-2419; Nguyen, S. T., Johnson, L. W., Grubbs, R. H., Ziller, J. W., J. Am. Chem. Soc. 1992, 114, 3974-3975; Bielawski, C. W., Grubbs, R. H., Angew. Chem. Int. Ed. 2000, 39, 2903-2906). However, a disadvantage here is their high cost, and particularly the difficulty of separation thereof from the reaction product. Residues of ruthenium lead to an often unacceptable colour of the product. In these cases, the polymer has to be purified by complex methods, for example reprecipitation, which is a barrier to economic preparation.

The properties of the resulting polymer can be adjusted via parameters such as temperature, concentration of monomer, catalyst concentration and reaction time. The molecular weight can be controlled via the addition of chain transfer agents, the task of which is to terminate the growing chain. Since the process is a statistical process, the molecular weight, in a first approximation, is in a reciprocal relationship to the concentration of chain transfer agent. Broadening of the molecular weight distribution as a consequence of secondary metathesis (chain transfer or "back-biting") is not being considered here. Thus, it is possible through addition of chain transfer agents to affect the molecular weight, but not the breadth of the molecular weight distribution. Later on in the reaction, there is secondary metathesis, in which what adds onto the active end of a growing chain is not a further monomer molecule but an existing polymer chain. The result is chain transfer, which results in an increase in the polydispersity (expressed as $(M_w/M_n)-1$ or $M_w/M_n$). A further observation with advancing reaction is the shift in the cis/trans ratio in favour of the trans configuration. This is an effect which can likewise be attributed to the secondary metathesis. In order to establish particular properties in the polymer, what is thus required is exact control of a wide variety of different process parameters.

The polymerization of cycloalkenes by ROMP constitutes an important process for preparing polyalkenamers. One example of this is the polymerization of cyclooctene to give polyoctenamer (for example VESTENAMER® from Evonik Industries, DE). In general, the polyalkenamer is used in solid form; for some applications, however, it is necessary for the polymer to be in a liquid state at room temperature. An important application for polyalkenamers is use in packaging, for example in packaging films, in order to improve the barrier properties of the film, especially with respect to oxygen, but also other substances, for example $CO_2$ or water. More particularly, the barrier properties are improved by the chemical binding of oxygen by the polyalkenamers (active barrier effect). In this case, generally a transition metal compound which accelerates the reaction of the polyalkenamer with oxygen is added to the polyalkenamer (EP2017308A1).

The polymerization of the cycloalkenes leaves monomers and oligomers of the monomer in the product mixture obtained. Studies have shown that these compounds in particular have elevated odour activity. Several authors report that the odour activity is correlated to the molar mass among other properties. Odorous substances of this kind (odour-active organic compounds, OVOCs), according to the source, have molar masses of not more than 350 g/mol or less than 300 g/mol, in order to be sufficiently volatile and perceptible as an odour (M. Schlegelmilch, Geruchsmanagement: Methoden zur Bewertung und Verminderung von Geruchsemissionen [Odour Management: Methods of Assessing and Reducing Odour Emissions], Hamburger Berichte 32 from the Hamburg-Harburg University of Technology, Abfall aktuell Publishers 2009, ISBN 978-3-9810064-9-0; M. Schön, R. Hübner, Geruch-Messung und Beseitigung [Odour—Measurement and Elimination], Vogel Publishers Würzburg, 1st edition 1996, ISBN 3-8023-1561-8; Umweltbundesamt, Innenraumlufthygiene-Kommission des Umweltbundesamtes, Leitfaden für die Innenraumhygiene in Schulgebäuden [German Environment Agency, Indoor Air Hygiene Commission of the German Environment Agency, Guidelines for Indoor Air Hygiene in School Buildings], page 47, 2008; G. Scharfenberger, Papier+Kunststoff-Verarbeiter 10, 1990).

The problem addressed was thus that of providing a process for producing polyalkenamer-containing compositions which results in products having reduced odour activity. Compared to the methods of the prior art, polymers having a suitable reduced monomer and oligomer content were to be obtained within a relatively short time. The higher extraction rate is demonstrated by a comparative study by means of TDS GC-MS (TDS=thermal desorption).

The polyalkenamer compounds were to have at least an equal active barrier effect (for example equal effect in the chemical binding of oxygen). This was to assure use in the food sector.

The object was achieved by integrating into the process an extraction step using particular solvent mixtures, which is especially conducted in a particular temperature range.

The object was accordingly achieved by a process for producing a polyalkenamer-containing composition, comprising the steps of:
 a) converting at least one cycloalkene by ring-opening metathetic polymerization to obtain a polyalkenamer-containing product mixture,
 b) converting the product-mixture into solid form,
 c) the product-mixture in solid form is granulated or pulverized to particles prior to step d) and
 d) working up the product mixture to remove the monomers and the oligomers of the cycloalkenes to obtain the polyalkenamer-containing composition,
wherein step d) is effected by extraction in a solvent mixture comprising at least one solvent 1 and at least one solvent 2, where the solubility parameter δ of the solvents 1 is not more than 20.07 MPa$^{1/2}$ (9.8 (cal/cm$^3$)$^{1/2}$) and the solubility parameter δ of the solvents 2 is at least 20.27 MPa$^{1/2}$ (9.9 (cal/cm$^3$)$^{1/2}$). The solubility parameter δ of the solvents 1 is preferably not more than 19.87 MPa$^{1/2}$ (9.7 (cal/cm$^3$)$^{1/2}$), more preferably not more than 19.46 MPa$^{1/2}$ (9.5 (cal/cm$^3$)$^{1/2}$) and especially preferably not more than 18.43 MPa$^{1/2}$ (9 (cal/cm$^3$)$^{1/2}$), very especially preferably not more than 17.41 MPa$^{1/2}$ (8.5 (cal/cm$^3$)$^{1/2}$) and especially not more than 16.38 MPa$^{1/2}$ (8 (cal/cm$^3$)$^{1/2}$). The decisive parameter amounts refer to the cal unit as these amounts are disclosed in the literature (Polymer Handbook, eds.: Brandrup, J.; Immergut, E. H.; Grulke, E. A., 4th Edition, John Wiley, New York, 1999, ISBN 0-471-16628-6, VII/676; the numerical values for individual solvents can be found in Table 7 (VII/688-694) or table 8 (VII/694-697)).

In a preferred embodiment of the invention the solvents of the solvent mixture are miscible (single-phase) or partially miscible, more preferably miscible. The miscibility of the solvents are measured pursuant to W. M. Jackson, J. S. Drury, Ind. Eng. Chem., 1959, 51 (12), 1491-1493.

Oligomers in the context of this invention especially include the dimer, trimer and tetramer of the cycloalkene used. Polyalkenamers in the context of this invention are polymers of cycloalkenes comprising at least five cycloalkene monomer units.

It is preferable that the sum total of monomer, dimer, trimer and tetramer (impurities) in the polyalkenamer-containing composition is less than 20 000 ppm, based on the total weight of the composition. More preferably less than 10 000 ppm, even more preferably less than 2500 ppm and especially less than 1000 ppm of impurities are present.

The di-, tri- and tetramers are determined quantitatively as follows: Sample preparation: 400 mg of sample in each case are weighed accurately into a 10 ml standard flask and about 8 ml of dichloromethane are added. With the aid of an agitator, the sample is dissolved (ideally overnight); subsequently, the standard flask is made up to the mark with dichloromethane and mixed again. 50 µl of the sample solution thus obtained are injected with a microlitre syringe into a pad of silanized glass wool within a TDS tube. The tube is left to stand in a fume hood for about 30 minutes, so that the solvent can evaporate.

External standard solution: 50 mg of hexadecane are weighed accurately into a 100 ml standard flask, made up to the mark with methanol and homogenized by shaking. 5 µl of this solution (corresponding to about 2.5 µg) are applied to a Tenax tube. This external standard is analysed once at the start and once at the end of the sequence.

The determination was effected by means of an Agilent 6890 gas chromatograph with ChemStation software; parameters: Rtx-5 separation column; length: 60 m; internal diameter: 250 µm; film thickness: 0.25 µm; carrier gas: helium; column supply pressure: 203.1 kPa; oven temperature: 50° C.-10° C./min-320° C. (33 min); split: 50:1; detector temperature: 280° C. (Thermal Aux)). The thermal desorption unit has been set up as follows: Gerstel TDSA; TDS oven (initial temperature: 20° C.; equilibration time: 1 min; initial time: 0.5 min; heating rate: 60° C./min; end temperature: 280° C.; hold time: 10 min); cold application system (initial temperature: −150° C. (with liquid N$_2$ cooling); equilibration time: 1 min; initial time: 0.5 min; heating rate: 10° C./s; end temperature: 300° C.; hold time: 5 min). In addition, the following settings were used: transfer temperature: 300° C.; desorption mode: Solvent Venting—Dry Purge; venting time: 0.5 min; sample mode: Remove Tube.

The semiquantitative evaluation was effected against the external standard hexadecane. The response factor is assumed to be 1. Only the peak groups corresponding to the oligomers are integrated. The dimers elute around 20 min, the trimers at about 28 min and the tetramers around 37 min. Whether the peaks belong to the integrated region is determined using the mass spectra, the oligomers being easily characterizable by the ion masses m/z=220, m/z=330 and m/z=440 (di-, tri- and tetramer respectively).

The monomer was determined as follows:

Sample preparation: 300 mg of sample are weighed accurately into each of 6 headspace vials, 5 ml of dodecane are added and the mixture is homogenized by agitation. Two mixtures are analysed as samples. To each of two further mixtures are added 5 µl of the spiking solution. To each of the two other mixtures are added 10 µl of the spiking solution. Spiking solution: 300 mg of cyclooctane and 40 mg of cyclooctene are weighed accurately into a 25 ml standard flask and made up to the mark with dodecane and homogenized by shaking. 5 ml of this solution are pipetted into a 25 ml standard flask and made up to the mark with dodecane and homogenized by shaking.

The determination was effected by means of an Agilent 7890 gas chromatograph with ChemStation software; parameters: separation column 1: fused silica CP-SIL 8CB; length: 50 m; internal diameter: 530 µm; film thickness: 1 µm; separation column 2: fused silica DB-WAX; length: 60 m; internal diameter: 530 µm; film thickness: 1 µm; carrier gas: nitrogen; column supply pressure: 10.15 psi; oven temperature: 50° C. (4 min)-5° C./min-130° C.-30° C./min-180° C. (10 min); injector temperature: 160° C.; detector temperature: 230° C.; detector $H_2$ flow: 40 ml/min; detector air flow: 400 ml/min; make-up flow ($N_2$): 25 ml/min.; headspace sampler: TurboMatrix 40 Perkin Elmer: oven temperature: 100° C.; needle temperature: 120° C.; transfer temperature: 150° C.; headspace pressure: 130 kPa; thermostating time: 60 min; pressure buildup time: 0.5 min; injection time: 0.16 min: needle residence time: 0.2 min; vial vent: yes. The quantitative evaluation was effected by the standard addition method on the two separation columns and over both spiking operations with a validated Excel sheet.

The solubility parameter δ for the component i is defined as $\delta_i = (\Delta E_i^v / V_i)^{1/2}$. In this formula, $\Delta E_i^v$ is the cohesive energy density; it corresponds to the evaporation energy per $cm^3$ of the solvent. $V_i$ is the molar volume of the component i. The dimension of $\delta_i$ is $(cal/cm^3)^{1/2} = 2.046$ $MPa^{1/2}$; see Polymer Handbook.

Preferably, suitable solvents 1 are selected from hexane, heptane, diamyl ether, diethyl ether, butyl butyrate, ethyl amyl ketone, butyl acetate, methyl isobutyl ketone, methyl amyl ketone, amyl acetate, ethyl n-butyrate, carbon tetrachloride, diethyl carbonate, propyl acetate, diethyl ketone, dimethyl ether, toluene, ethyl acetate, tetrahydrofuran, benzene, tetrachloroethylene, chloroform, methyl ethyl ketone, chlorobenzene, dichloromethane, chloromethane, 1,1,2,2-tetrachloroethane, ethylene dichloride or mixtures thereof. Particularly preferred solvents 1 are selected from the group consisting of hexane, heptane, toluene, tetrahydrofuran, chloroform, methyl ethyl ketone, dichloromethane, ethyl acetate or mixtures thereof, very particular preference being given to hexane, toluene or mixtures thereof.

Preferably, suitable solvents 2 are selected from acetone, 1,2-dichlorobenzene, carbon disulphide, 1,4-dioxane, cresol, aniline, pyridine, N,N-dimethylacetamide, cyclohexanol, cyclohexanone, butyl alcohol, 2-butyl alcohol, acetonitrile, dimethyl sulphoxide, N,N-dimethylformamide, furfuryl alcohol, propylene glycol, 1,2-propylene carbonate, ethanol, methanol, propanol, isopropanol, butanols, ethylene glycol, ethylene carbonate, glycerol, water or mixtures thereof. Particularly preferred solvents 2 are selected from the group consisting of acetone, isopropanol, acetonitrile, ethanol, methanol, propanol, butanols, water or mixtures thereof, very particular preference being given to acetone, isopropanol or mixtures thereof.

The solvent mixture is preferably used in a ratio of solvent 1 to solvent 2 of 95:5 to 5:95 (volume/volume). Preferably solvent 2 (in relation to solvent 1) is in excess. In case the polarity of the solvent mixture is too low, the polyalkenamer will be dissolved in the solvent mixture. Therefore, a skilled person can easily choose a suitable solvent mixture by preliminary studies. Preference is being given to mixtures in the range from 45:55 to 5:95, more preferably 40:60 to 5:95, and most preferred 20:80 to 5:95. According to the extraction temperature, adjustments in the ratio is maybe needed to achieve an optimal result with regard to the extraction rate and maintenance of a stable particulate structure of the extraction material.

A particularly preferred mixture is hexane/acetone or hexane/isopropanol, very particular preference being given to hexane/acetone or hexane/isopropanol in a mixture of 45:55 to 5:95, more preferably 40:60 to 5:95, and most preferred 20:80 to 5:95.

The conversion of the cycloalkene(s) can be conducted without solvent. Alternatively, the reaction can be conducted in at least one solvent. Suitable solvents are, for example, saturated aliphatic hydrocarbons such as hexane, heptane, octane, nonane, decane, dodecane, cyclohexane, cycloheptane or cyclooctane; aromatic hydrocarbons such as benzene, toluene, xylene or mesitylene; halogenated hydrocarbons such as chloromethane, dichloromethane, chloroform or carbon tetrachloride; ethers such as diethyl ether, tetrahydrofuran or 1,4-dioxane; ketones such as acetone or methyl ethyl ketone; esters such as ethyl acetate; and mixtures of the aforementioned solvents. More preferably, the solvent for the reaction is selected from the group consisting of aliphatic and aromatic hydrocarbons, here especially preferably hexane and toluene. Additionally selected with preference are tetrahydrofuran, methyl ethyl ketone, chloromethane, dichloromethane, chloroform or mixtures thereof, very particular preference being given to hexane or toluene. The content of solvents may be set, for example, to a value of 20% to 60% by weight, preferably of 40% to 60% by weight, based on the total weight of cycloalkene and solvent.

In the choice of solvents for the ring-opening metathesis reaction, it should be noted that the solvent should not deactivate the catalyst or the catalytically active species. This can be recognized by the person skilled in the art by simple experiments or by studying the literature. In the case of catalyst systems containing aluminium organyls, aromatic or aliphatic hydrocarbons bearing no heteroatoms are especially suitable.

In a further embodiment of the invention, the solvent mixture may contain a stabilizer. This can diffuse into the polyalkenamer and increase its storage stability and/or processing stability. Suitable stabilizers may be selected from the group of the sterically hindered phenols, for example 2,5-di-tert-butylhydroquinone, 2,6-di-tert-butyl-p-cresol, 4,4'-thiobis(6-tert-butylphenol), 2,2'-methylenebis(4-methyl-6-tertbutylphenol), octadecyl 3-(3',5'-di-tert-butyl-4'-hydroxyphenyl)propionate, 4,4'-thiobis-(6-tert-butylphenol), 2-tert-butyl-6-(3-tert-butyl-2-hydroxy-5-methylbenzyl)-4-methylphenyl acrylate, 2,6-di(tert-butyl)-4-methylphenol (BHT), 2,2-methylenebis(6-tert-butyl-p-cresol), from the group of the organic phosphites, for example triphenyl phosphite, tris(nonylphenyl) phosphite, the group of the organic thio compounds, for example dilauryl thiodipropionate, pentaerythritol tetrakis(3-laurylthiopropionate) and ascorbic acid and mixtures thereof.

The stabilizer may be present within a range from 5 to 7500 ppm, preferably 25 to 750 ppm, based in each case on the weight of the polyoctenamer. It is possible to add the stabilizer according to one of the following steps:

The stabilizer can be incorporated into the melt of the polymer, for example via compounding in an extruder. The stabilizer can either be metered in directly or added via a masterbatch. This can also occur only in the course of further processing to give a blend with a polymer and/or the production of shaped bodies, for example films. Another option is to dissolve the stabilizer in a suitable solvent and to apply it to the particles of the polyalkenamer. Subsequently, the solvent is removed, for example by a drying step, in which elevated temperature and/or reduced pressure are used. The stabilizer then remains on the surface of the particles and/or is absorbed into the particles during the drying. Another option is to apply the stabilizer to the particles as a powder coating.

It is also possible to produce a mixture in which polyalkenamer particles including a stabilizer in a relatively high concentration are present alongside polyalkenamer particles containing no stabilizer or a lower concentration of stabilizer.

In addition, the polyoctenamer composition may contain dyes (soluble colourants).

If a solvent 1 is used for the conversion of the cycloalkenes mentioned, the same solvent or another solvent 1 can be used for the workup of the product mixture.

In a preferred embodiment of the process according to the invention, the cycloalkene is selected from the group consisting of cyclobutene, cyclopentene, cycloheptene, cyclooctene, cyclononene, cyclodecene, cyclododecene, cycloocta-1,5-diene, 1,5-dimethylcycloocta-1,5-diene, cyclodecadiene, norbornadiene, cyclododeca-1,5,9-triene, trimethylcyclododeca-1,5,9-triene, norbornene (bicyclo[2.2.1]hept-2-ene), 5-(3'-cyclohexenyl)-2-norbornene, 5-ethyl-2-norbornene, 5-vinyl-2-norbornene, 5-ethylidene-2-norbornene, dicyclopentadiene and mixtures thereof. Cyclooctene is a preferred cycloalkene because of its availability and ease of handling. It is possible to use two or more cycloalkenes, so as to form copolymers of the polyalkenamer. The cycloalkenes may be substituted by alkyl groups, aryl groups, alkoxy groups, carbonyl groups, alkoxycarbonyl groups and/or halogen atoms.

In a preferred embodiment of the process according to the invention, the extraction is conducted within a temperature range from 20° C. up to the boiling range of the solvent mixture (reflux), preferably to 60° C., more preferably in the range from 30° C. to 50° C. and even more preferably in the range from 35° C. to 45° C. However, the temperature within the ranges of values mentioned is limited by the boiling point of the solvent and the properties of the polyalkenamers. For example, the temperature should not be above the melting point of a semicrystalline polymer or the glass transition temperature of an amorphous polymer. It is possible in principle to extract the polyalkenamer in the molten state. However, this is less preferred since the discrete particles originally present can form lumps or coalesce. This reduces the surface area of the extraction material, and the extraction rate falls. As a result, the product obtained has to be converted back to a homogeneous particulate form after the extraction, for example by granulation or grinding.

The extraction can be conducted in various forms; for example, it is possible to employ the principle of Soxhlet extraction, such that the material to be extracted is contacted semi-continuously with fresh solvent. The extraction can also be conducted in such a way that, for example, in a stirred tank, the volume of solvent at a particular time is exchanged completely or partially for a new volume of solvent, in which case this can be repeated several times. In addition, it is possible to conduct the extraction in such a way that a solvent recycling operation is integrated, in which case the recycling may relate to one or more components of the mixture. As the case may be, it may then be necessary to meter more of one or more of the components into the recyclate in order to re-establish the original mixing ratio. In addition, the extraction can also be conducted in such a way that the ratio of the components changes in the course of the extraction, in which case the change may be constant or occur in jumps.

The extraction is preferably conducted under inert gas.

The temperature and/or the pressure can be kept constant during the extraction. It is also conceivable that temperature or pressure are varied in the course of the extraction operation.

After the extraction, the polyalkenamer-containing composition can be separated from the remaining solvent, for example, by decanting it off or filtering. Alternatively or additionally, a drying operation can be conducted, for example under reduced pressure and/or at elevated temperature, in order to remove the solvent.

The polyalkenamer-containing product mixture obtained in a) may be in solid form or in liquid form (dissolved in solvent or melted or both). In case the product mixture is in liquid form, the product-mixture has to be converted into solid form (step b). The solvent may be removed by heating or reducing the pressure, for example by means of vacuum degassing. The melted product mixture has to be cooled down to obtain solid form. Prior to the performance of step d), the product mixture is pelletized to particles, for example by strand pelletization or underwater pelletization, or pulverized, for example by spray-drying or grinding (step c). Preferably, the mean mass of the particles is less than 100 g/1000, more preferably less than 10 g/1000 and especially preferably less than 1 g/1000. This includes mean masses up to a maximum size of 1000 g/1000.

To determine the mean mass, about 2-3 g of the particles are applied to a clean underlayer, for example a sheet of paper. Subsequently, all grains in this sample are counted and transferred to a petri dish; spikes of length >1.0 cm or chains of pellets >1.0 cm are excluded (discarded) and are not assessed here. The number of pellet grains is noted; it has to be min. 150. Subsequently, the pellet grains are weighed accurately to 0.1 g and expressed on the basis of 1000 pellets. If there are less than 150 pellet grains, a new, correspondingly larger particle volume has to be taken as sample.

The process according to the invention can be conducted continuously or batchwise.

The polyoctenamer preferably has a weight-average molecular weight (Mw) of 5000 g/mol to 500 000 g/mol, preferably of 10 000 g/mol to 250 000 g/mol and more preferably of 20 000 to 200 000 g/mol. The molecular weight is determined by means of Gel Permeation Chromatography (GPC) against a polystyrene standard. The measurement is based on DIN 55672-1.

Sample preparation: The samples are dissolved with a content of 5 g/l in tetrahydrofuran at room temperature. They are filtered prior to injection into the GPC system (0.45 μm syringe filter). The measurement is effected at room temperature.

Column Combination

1×5 cm, 5 μm, 100 Å, (styrene-divinylbenzene copolymer)
1×30 cm, 5 μm, 50 Å, (styrene-divinylbenzene copolymer)
1×30 cm, 5 μm, 1000 Å, (styrene-divinylbenzene copolymer)
1×30 cm, 5 μm, 100 000 Å, (styrene-divinylbenzene copolymer)
Mobile phase: ultrapure tetrahydrofuran, stabilized
Flow rate: 1 ml/min
Detection: refractive index detector
Calibration: polystyrene The desired molar mass can be established, for example, in the presence of at least one chain transfer agent, which allows the chain buildup to be stopped. Suitable chain transfer agents are, for example, acyclic alkenes having one or more non-conjugated double bonds which may be in terminal or internal positions and which preferably do not bear any substituents. Such compounds are, for example, pent-1-ene, hex-1-ene, hept-1-ene, oct-1-ene or pent-2-ene. In addition, it is possible to use cyclic compounds having a double bond in the side chain thereof, for example vinylcyclohexene.

The cis/trans ratio of the cycloalkenamers can be adjusted by methods familiar to the person skilled in the art. For example, the ratio is dependent on catalysts, solvents, stirring intensity or temperature or reaction time. Preferably, the trans content is at least 55%. The cis/trans ratio is determined by means of $^1$H NMR in deuterochloroform.

The conversion of the cycloalkene can be effected in the presence of at least one catalyst. Suitable catalysts are, for example, transition metal halides which, together with an organometallic compound as cocatalyst, form the species which is catalytically active for the polymerization. The metal in the organometallic compound differs here from the transition metal in the halide. Alternatively, it is possible to use transition metal-carbene complexes. Useful transition metals include metals of groups 4 to 8, for example molybdenum, tungsten, vanadium, titanium or ruthenium. Metals in the organometallic compound are, for example, aluminium, lithium, tin, sodium, magnesium or zinc. Suitable catalysts and the amounts thereof to be used are detailed, for example, in EP-A-2017308.

Preference is given to using a catalyst system containing at least one alkylaluminium chloride, tungsten hexachloride or mixtures. Suitable alkylaluminium chlorides are ethylaluminium dichloride (EtAlCl$_2$) and ethylaluminium sesquichloride, which may also be used in mixtures. A preferred catalyst system contains tungsten hexachloride and ethylaluminium dichloride or, in a particularly preferred embodiment, consists of these two compounds. The mass ratio of the aluminium chlorides to tungsten hexachloride is preferably one to six. Particular preference is given to a ratio of two to five. To activate the catalyst, acidic compounds such as alcohols can be used.

The tungsten hexachloride can be used within a range from 0.1 to 0.04 mol %, more preferably from 0.1 to 0.01 mol %, based on the cycloalkene used. The alkylaluminium chlorides are preferably within a range from 0.2 to 0.08 mol %, more preferably 0.2 to 0.02 mol %, based on cycloalkene.

The conversion of the cycloalkenes can be conducted either isothermally or adiabatically. The temperature is preferably within a range between −20 and 120° C. This is dependent particularly on the monomers used and any solvent present. A particularly preferred temperature is in the range from 10 to 60° C. The reaction preferably takes place in a protective gas atmosphere. In the case of an adiabatic process regime, the temperature can be determined via parameters such as amount of catalyst, rate of catalyst addition, time of termination of the reaction, etc. The preferred temperature range here is 20 to 50° C.

On attainment of the desired reaction time, the polymerization can be ended by inactivation of the catalyst system. For this purpose, for example, it is possible to add a suitable amount of CH-acidic compound. Suitable examples for this purpose are alcohols such as methanol, ethanol, propanol, etc., or else carboxylic acids such as acetic acid.

The invention further provides a polyalkenamer-containing composition comprising at least 95% by weight of polyalkenamer, wherein less than 20 000 ppm of impurities are present, based on the polyalkenamer-containing composition. Preferably less than 10 000 ppm, even more preferably less than 2500 ppm and especially less than 1000 ppm of impurities are present.

In a preferred embodiment of the invention, the polyalkenamer is cyclobutene, cyclopentene, cycloheptene, cyclooctene, cyclononene, cyclodecene, cyclododecene, cycloocta-1,5-diene, 1,5-dimethylcycloocta-1,5-diene, cyclodecadiene, norbornadiene, cyclododeca-1,5,9-triene, trimethylcyclododeca-1,5,9-triene, norbornene (bicyclo [2.2.1]hept-2-ene), 5-(3'-cyclohexenyl)-2-norbornene, 5-ethyl-2-norbornene, 5-vinyl-2-norbornene, 5-ethylidene-2-norbornene, dicyclopentadiene and mixtures thereof.

The polyalkenamer-containing composition can be mixed with a matrix resin. This mixture may contain, for example, 1% to 30% by weight of the composition and 70% to 99% by weight of the matrix. Suitable matrix resins are mentioned, for example, in EP-A-2017308.

Preferably, the polyalkenamer-containing composition mentioned is produced by the process described in detail above.

The invention likewise provides for the use of at least one polyalkenamer-containing composition according to the invention or of at least one composition obtained by the process according to the invention in packaging materials, wherein the packaging materials are preferably used for food and drink.

EXAMPLES

Polymers

Polymer 1: Vestenamer® 8020 (Polyoctenamer) of Evonik, Germany was used as the polyalkenamer-containing product mixture.

Polymer 2: Polymer 2 was produced from polymer 1 by a re-granulation process. Polymer 1 was fed into a twin screw extruder Werner & Pfleiderer ZSK30 via the main hopper. The barrel temperature was 125° C. A screw speed of 250 rpm was applied and the throughput of the polymer was chosen to be 6 kg/h. The effective melt temperature at the die was measured with a thermometer to be 186° C. After leaving the front plate of the extruder at the die the melt strand was cooled in a water bath and after that in air. Then the polymer strand was pelletized with a pelletizer (cutter). The cutter was operated at a strand speed of 57 m/min. The re-granulation process was conducted until an amount of 100 kg of polymer 2 was obtained.

Determination of Molecular Weight

The molecular weights of the polymers were determined by gel permeation chromatography (method: cf. description).

| VESTENAMER 8020 ® (polyoctenamer) | Mn in g/mol | Mw in g/mol | Mp in g/mol | Polydispersity |
|---|---|---|---|---|
| Polymer 1 | 8700 | 156100 | 114000 | 18.0 |
| Polymer 2 | 9100 | 164300 | 116900 | 18.1 |

Mn = number average molecular weight
Mw = weight average molecular weight
Mp = peak molecular weight Trans Content of Double Bonds The trans-content of double bonds of both polymers was determined by $^1$H NMR in deuterochloroform (CDCl$_3$). The trans-content was 80% for polymer 1 and polymer 2.

Average Particle Weight

Polymer 1: The average weight of the particles is 54.0 g/1000.

Polymer 2: The average weight of the particles is 2.1 g/1000. (method: cf. description)

Solvents n-Hexane: Merck, n-Hexane for liquid chromatography LiChrosolve®, >=98.0% GC (solvent 1)

Toluene: Sigma-Aldrich, puriss. p.a., ACS reagent, reag. ISO, reag. Ph. Eur., >=99.7% GC (solvent 1)

Acetone: Sigma-Aldrich, puriss. p.a., ACS reagent, reag. ISO, reag. Ph. Eur., >=99.5% GC (solvent 2)

Isopropyl alcohol: Sigma-Aldrich, >=99.7% FCC, FG (solvent 2)

The solvents used in examples are miscible.

Extraction Procedure

Equipment

Electric shaking apparatus Memmert WNB45/SV2945: 250 mL Erlenmeyer flask with glass stopper and fixing clip.

Extraction

A sample of 10 g of polymer 1 or polymer 2 was transferred into a 250 mL Erlenmeyer flask. After that 180 mL of extraction medium was introduced. The extraction medium consisted of a volume/volume mixture of one solvent 1 and one solvent 2. The exact compositions of these mixtures are given in table 1. These solvent mixtures were homogeneous, single-phase mixtures (no phase separation was visible). In the comparative examples only extraction media were used which consisted of one solvent. As indicated in table 1 in some cases Irganox 1076 was introduced into the extraction medium (2 mg was added into 180 mL of extraction medium by using 100 µL of a 20 mg/mL solution of Irganox 1076 in the extraction medium). The flasks were closed with the stopper. Thereafter the flasks were transferred into a water bath with a temperature of 20° C. or 40° C., respectively. While being in the water bath the flasks were shaken by means of an electric shaking apparatus for four hours at a frequency of 105/min. After four hours the solvent was removed and a sample of 4 g of polymer was taken. The remaining amount of 6 g was put back into the Erlenmeyer flask and another 180 mL of extraction medium was added. Then the extraction procedure was conducted as described before. After another four hours of shaking time (in total now 2×4 hours) the extraction medium was removed and the polymer material was collected. The material was then dried at room temperature under a gentle nitrogen flow. After that the samples were kept at ambient conditions under air for 24 hours. The samples related to a total extraction time of 2×4 hours were then subjected to the measurement of cyclooctene content and the content of di-, tri- and tetramers of cyclooctene (cf. description).

TABLE 1 results of extraction - amounts of oligomers

| # | polymer | solvent 1 | solvent 2 | solvent mixture | stabilizer | temp./° C. | dimer/ mg/kg | trimer/ mg/kg | tetramer/ mg/kg | total/ mg/kg |
|---|---|---|---|---|---|---|---|---|---|---|
| 1* | 1 | — | — | — | — | — | 3520 | 9576 | 6487 | 19583 |
| 2* | 2 | — | — | — | — | — | 1629 | 9969 | 6604 | 20202 |
| 3* | 2 | — | acetone | — | yes | 40 | <100 | 185 | 1829 | 2114 |
| 4* | 2 | — | acetone | — | yes | 20 | 523 | 2580 | 3147 | 6249 |
| 5* | 1 | — | acetone | — | yes | 40 | 841 | 2758 | 3240 | 6838 |
| 6* | 2 | — | Isoprop. | — | yes | 40 | 329 | 1696 | 2701 | 4726 |
| 7 | 2 | hexane | acetone | 20:80 | yes | 40 | <100 | 178 | 1091 | 1369 |
| 8 | 2 | toluene | acetone | 20:80 | yes | 40 | <100 | <150 | 1541 | 1791 |
| 9 | 2 | hexane | acetone | 10:90 | yes | 40 | <100 | <150 | 1467 | 1717 |
| 10 | 1 | hexane | acetone | 20:80 | yes | 40 | <100 | 240 | 1257 | 1596 |
| 11 | 2 | hexane | acetone | 20:80 | yes | 20 | <100 | 195 | 1730 | 2025 |
| 12 | 2 | hexane | acetone | 40:60 | yes | 20 | <100 | <150 | 1566 | 1816 |
| 13 | 2 | hexane | acetone | 20:80 | no | 40 | <100 | <150 | 857 | 1107 |
| 14 | 2 | hexane | isoprop. | 20:80 | yes | 40 | <100 | <150 | 1575 | 1825 |
| 15 | 2 | toluene | isoprop. | 20:80 | yes | 40 | <100 | 240 | 1400 | 1740 |

*non-inventive
isoprop. = isopropyl alcohol

Samples #1 and #2 contain 15 mg/kg or 11 mg/kg of monomer cyclooctene, respectively. Cyclooctene in samples #3-#15 is below the levels detectable by method of analysis (below 0.5 mg/kg).

Without any extraction, polymer 1 comprises 19.583 mg/kg and polymer 2 comprises 20.202 mg/kg of oligomers. In case of an extraction with acetone or isopropyl alcohol (#3-#6) the total amount of oligomers is much higher than in case of #7-#15 performing with solvent mixtures.

TABLE 2 comparison of examples in view of same conditions

| group of tests | total oligomers (comparative examples) | total amount of oligomers and percentage amount of reduction (examples according to the invention) | | | |
|---|---|---|---|---|---|
| polymer 2, acetone, 40° C. | 2114 (#3) | 1369 (#7) 35.2% | 1791 (#8) 15.3% | 1717 (#9) 18.8% | 1107 (#13) 47.6% |
| polymer 2, acetone, 20° C. | 6249 (#4) | 2025 (#11) 67.6% | 1816 (#12) 70.9% | | |

TABLE 2-continued comparison of examples in view of same conditions

| group of tests | total oligomers (comparative examples) | total amount of oligomers and percentage amount of reduction (examples according to the invention) | |
|---|---|---|---|
| polymer 1, acetone, 40° C. | 6838 (#5) | 1596 (#10) 76.7% | |
| polymer 2, isoprop., 40° C. | 4726 (#6) | 1825 (#14) 61.4% | 1740 (#15) 63.2% |

By performing the inventive extraction method the oligomers which cause odor are reduced in an amount of 15.3% to 76.7%. In other words by adding a solvent with a solubility parameter δ of not more than 20.05 (J/cm$^3$)$^{1/2}$ the undesirable oligomers can be removed in higher amounts within the same time period (namely eight hours). Consequently, the extraction of oligomers by using the inventive method is faster and more effective than extractions of the art.

The invention claimed is:

1. A process for producing a polyalkenamer-containing composition, comprising the steps of:
   a) converting at least one cycloalkene by ring-opening metathetic polymerization, in the presence of a chain transfer agent, to obtain a polyalkenamer-containing product-mixture,
   b) converting the product-mixture into solid form,
   c) granulating or pulverizing the product-mixture in solid form to particles prior to step d), and
   d) working up the product-mixture to remove the at least one cycloalkene monomer and/or an oligomer of the at least one cycloalkene to obtain the polyalkenamer-containing composition, wherein
      step d) is effected by extraction in a solvent mixture comprising at least one solvent 1 and at least one solvent 2, where the solubility parameter δ of the solvents 1 is not more than 20.07 MPa$^{1/2}$ and the solubility parameter δ of the solvents 2 is at least 20.27 MPa$^{1/2}$.

2. The process according to claim 1, wherein the at least one solvent 1 is present in relation to the at least one solvent 2 in a mass ratio of 95:5 to 5:95.

3. The process according to claim 1, wherein the at least one cycloalkene is at least one member selected from the group consisting of cyclobutene, cyclopentene, cycloheptene, cyclooctene, cyclononene, cyclodecene, cyclododecene, cycloocta-1,5-diene, 1,5-dimethylcycloocta-1,5-diene, cyclodecadiene, norbornadiene, cyclododeca-1,5,9-triene, trimethylcyclododeca-1,5,9-triene, norbornene (bicyclo[2.2.1]hept-2-ene), 5-(3'-cyclohexenyl)-2-norbornene, 5-ethyl-2-norbornene, 5-vinyl-2-norbornene, 5-ethylidene-2-norbornene, dicyclopentadiene, and a mixture thereof.

4. The process according to claim 1, wherein the at least one solvent 1 is at least one member selected from the group consisting of hexane, heptane, diamyl ether, diethyl ether, butyl butyrate, ethyl amyl ketone, butyl acetate, methyl isobutyl ketone, methyl amyl ketone, amyl acetate, ethyl n-butyrate, carbon tetrachloride, diethyl carbonate, propyl acetate, diethyl ketone, dimethyl ether, toluene, ethyl acetate, tetrahydrofuran, benzene, tetrachloroethylene, chloroform, methyl ethyl ketone, chlorobenzene, dichloromethane, chloromethane, 1,1,2,2-tetrachloroethane, ethylene dichloride, and a mixture thereof.

5. The process according to claim 1, wherein the at least one solvent 2 is at least one member selected from the group consisting of acetone, 1,2-dichlorobenzene, carbon disulphide, 1,4-dioxane, cresol, aniline, pyridine, N,N-dimethylacetamide, cyclohexanol, cyclohexanone, butyl alcohol, 2-butyl alcohol, acetonitrile, dimethyl sulphoxide, N,N-dimethylformamide, furfuryl alcohol, propylene glycol, 1,2-propylene carbonate, ethanol, methanol, propanol, isopropanol, a butanol, ethylene glycol, ethylene carbonate, glycerol, water, and a mixture thereof.

6. The process according to claim 1, wherein the extraction is conducted within a temperature range from 20° C. up to the boiling range of the solvent mixture.

7. The process according to claim 1, wherein the solvent mixture is a single phase.

8. The process according to claim 1, wherein the solvent removing of step b) is performed by vacuum degassing.

9. The process according to claim 1, wherein the conversion of the at least one cycloalkene is conducted in the presence of a catalyst.

10. The process according to claim 1, wherein the solvent mixture comprises at least one stabilizer.

11. The process according to claim 1, wherein the at least one solvent 1 is at least one member selected from the group consisting of hexane, heptane, toluene, tetrahydrofuran, chloroform, methyl ethyl ketone, dichloromethane, ethyl acetate, and a mixture thereof.

12. The process according to claim 1, wherein the at least one solvent 2 is at least one member selected from the group consisting of acetone, isopropanol, acetonitrile, ethanol, methanol, propanol, a butanol, water, and a mixture thereof.

13. The process according to claim 1, wherein the conversion of the at least one cycloalkene is conducted in the presence of a catalyst comprising at least one transition metal halide and an organometallic compound or comprising at least one transition metal-carbene complex.

14. The process according to claim 1, wherein the conversion of the at least one cycloalkene is effected in the presence of an acyclic alkene as chain transfer agent having one or more non-conjugated double bonds, or a cyclic compound having a double bond in their side chain.

15. A polyalkenamer-containing composition containing at least 95% by weight of polyalkenamer, wherein less than 20,000 ppm of a monomer of a cycloalkane and/or an oligomer of a cycloalkene are present, based on the polyalkenamer-containing composition.

16. The polyalkenamer-containing composition according to claim 15, wherein
the polyalkenamer is at least one member selected from the group consisting of cyclobutene, cyclopentene, cycloheptene, cyclooctene, cyclononene, cyclodecene, cyclododecene, cycloocta-1,5-diene, 1,5-dimethylcycloocta-1,5-diene, cyclodecadiene, norbornadiene, cyclododeca-1,5,9-triene, trimethylcyclododeca-1,5,9-triene, norbomene (bicyclo[2.2.1]hept-2-ene), 5-(3'-cyclohexenyl)-2-norbornene, 5-ethyl-2-norbornene, 5-vinyl-2-norbornene, 5-ethylidene-2-norbornene, dicyclopentadiene, and a mixture thereof.

17. A process of making a packaging material, the method comprising:
shaping the polyalkenamer-containing composition according to claim 15 into a packaging material.

18. The process according to claim 17, further comprising:
encasing food or drink in the packaging material.

* * * * *